Figure 1:
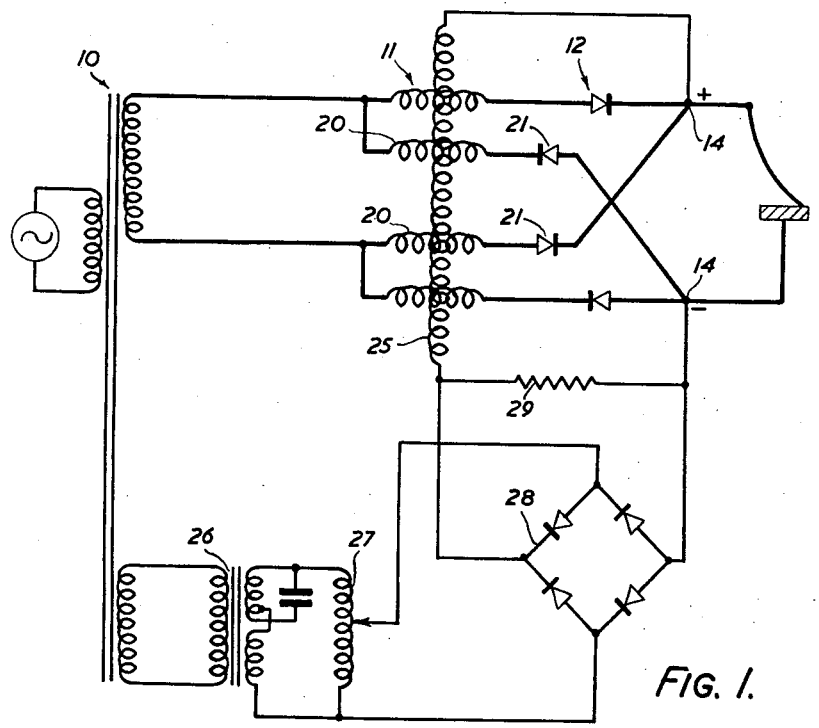

May 8, 1962

J. D. MORRIS ETAL 3,034,016

ARC WELDING CURRENT CONTROL APPARATUS

Filed Dec. 21, 1959

INVENTORS
JOHN D. MORRIS
SYDNEY HIRST

By
Watson, Cole, Grindle & Watson
ATTORNEYS

3,034,016
ARC WELDING CURRENT CONTROL APPARATUS
John D. Morris, Felbridge, East Grinstead, and Sydney Hirst, East Grinstead, England, assignors to Hirst Electronic Limited, Crawley, England, a company of Great Britain
Filed Dec. 21, 1959, Ser. No. 860,783
Claims priority, application Great Britain Dec. 24, 1958
4 Claims. (Cl. 315—176)

This invention relates to arc welding current control apparatus of the type in which it is required to produce a substantially constant D.C. voltage across the welding terminals from an A.C. supply.

According to the present invention arc welding current control apparatus includes a rectifier having its D.C. output connected to D.C. output terminals and its A.C. input connected through a saturable reactor to A.C. supply terminals, characterised in that the maximum voltage which the saturable reactor is designed to drop, before its inductance falls off due to saturation, is substantially less than that across the supply terminals. The said maximum voltage may, for example, be between a half and two-thirds of that across the supply terminals.

Preferably the saturable reactor is auto-excited, that is to say each portion of the load windings is connected in series with an element of the rectifier.

The saturable reactor may be provided with a control winding or set of control windings to which is supplied the difference between the arc voltage and a datum voltage which is constant in the sense of being independent of arc conditions. Preferably means is provided for varying the datum voltage at will. The control winding or set of control windings may be the only control windings of the saturable reactor.

Various arrangements have previously been proposed for supplying a constant voltage for arc welding, as is required for example for continuous welding processes. On the one hand an approximation to a constant voltage has been obtained by generous design of transformers and rectifiers to give improved regulation. With such an arrangement the voltage is not accurately constant, for example it might fall from an open-circuit value of 30 volts to a load value of 25 volts, and in addition the provision of different voltages at will involves some complication, for example the provision of a tapped auto-transformer or variable transformer. Such a device must be capable of relatively fine adjustment since a small change of voltage will make a relatively big difference to the arc current.

It has also been proposed to employ a saturable reactor or transformer in the input circuit of the rectifier and to provide a control winding for it which is energised in accordance with the difference between the arc voltage and a substantially constant datum voltage. In this prior arrangement the saturable reactor was designed to drop the full voltage of the supply at a small current in the absence of current in the control winding.

A disadvantage of such an arrangement arises from the time lag in the operation of the control winding. Thus on open-circuit the control winding carries zero current or a current in such direction as to have no tendency to saturate the reactor so that the reactor has its maximum inductance. If now contact is made between the electrodes, representing a short-circuit across the welding terminals, the whole of the input voltage will be dropped across the reactor at a low value of welding current and hence the welding current will, for the moment, be restricted. An appreciable time lag occurs before the current in the control winding responds to the drop of voltage across the welding terminals and produces saturation to lower the inductance of the reactor and allow the welding current to build-up. The result of this is liable to be that the build-up of welding current is delayed for one or two hundred milli-seconds, and the welding electrodes are liable to weld or freeze together during this period. In order to avoid this difficulty, further complicated measures have been introduced in the prior arrangement.

Moreover the prior arrangement employed a separate positive feed-back or exciting winding on the saturable reactor. This winding, carrying direct current and connected in series with the welding circuit, is also subject to a substantial time lag. Thus when a short-circuit occurs across the welding terminals a proportion of the available voltage may build-up across the feed-back winding whilst the current in it only builds up gradually due to its inductance. In the preferred arrangement in accordance with the present invention the saturable reactor is auto-excited so that the feed-back current tending to produce saturation is a pulsating current and hence achieves its ultimate value every half cycle.

Accordingly the present invention provides a very simple form of welding current control apparatus giving very effective control of the voltage.

The invention may be carried into practice in various ways but one embodiment will be described by way of example with reference to the accompanying drawings in which FIGURE 1 is a circuit diagram of the arrangement for use with a single phase supply of alternating current.

In this embodiment arc welding current control apparatus includes a main supply transformer 10 whereof the output is connected through a saturable reactor 11 to the input of a rectifier bridge 12 whereof the output is connected to the welding terminals 14.

The apparatus is required to provide a substantially constant voltage from a very low current up to a welding current of perhaps 600 amperes and it is moreover required that the constant or datum voltage should be capable of manual adjustment from a value of 20 volts up to 40 volts.

In accordance with the present invention the saturable reactor is designed to drop a voltage which cannot exceed a value considerably less than that supplied to the rectifier. In order to provide for unavoidable voltage drops in the transformer, the reactor, the rectifier and the wiring, the output voltage of the transformer is greater than than theoretically required to produce the maximum welding voltage, for example for a maximum D.C. welding voltage of 40 volts the transformer might produce a voltage corresponding to a D.C. voltage of 52 volts. In order to reduce the welding voltage to a value of 20 volts the saturable reactor is designed never to drop more than a voltage corresponding to a D.C. value of 32 volts.

The result of this is that when contact is made between the welding electrodes, representing a short-circuit across the welding terminals, the reactor will drop the equivalent of 32 volts at quite a small current in the welding circuit, but thereafter its inductance will immediately drop so that the remaining 20 volts is available to build-up the welding current immediately. The saturation being due to the alternating current in the main windings of the reactor it follows that there is no appreciable delay in the reduction of the inductance and hence the voltage across the welding terminals never falls below a value of some 20 volts. Accordingly there is no danger of the electrodes freezing together in the manner referred to above.

The connection of the saturable reactor to the rectifier is of the auto-excited type. That is to say each load winding 20 of the reactor is connected in series with a half-wave element 21 of the rectifier. This again ensures that the feed-back current, tending to saturate the reactor as the load current rises, builds up immediately and is not subject to a time lag due to the inductance of the windings.

The saturable reactor is provided with a single D.C. control winding, or set of control windings 25 in series or parallel, to which is supplied the difference between the arc voltage and a stabilised datum voltage. The datum voltage may be obtained from the alternating current supply through a constant voltage transformer 26, conveniently of the known type in which the secondary winding includes a tuned circuit tuned to the supply frequency. The output from this transformer is connected to an adjustable auto-transformer 27 of the variac type which supplies a bridge rectifier 28. The bridge rectifier output is shunted by a constant load 29 and has one terminal connected to one welding terminal whilst the other is connected through the control windings 25 of the saturable reactor to the other welding terminal.

Accordingly the datum voltage can be varied substantially continuously between a constant value of 20 volts and a constant value of 40 volts. Supposing the datum is set at 40 volts, then when the voltage across the welding terminals is equal to 40 volts there will be no current in the control winding of the saturable reactor and its inductance will be determined by its load current and its auto-excitation. If at any time the voltage across the welding terminals rises above 40 volts a current will immediately flow in the control winding in opposition to the auto-excitation, thereby tending to increase the inductance of the reactor and restore the welding voltage. Similarly if the welding voltage falls below 40 volts a current will flow in the control winding in such direction as to reinforce the auto-excitation and increase the welding voltage.

In order to provide the desired control with a minimum voltage drop across the control winding, and hence the minimum error in the welding voltage, the resistance of the control windings 25 should be reduced to a minimum, and hence the windings consist of a relatively small number of turns of stout wire. In a specific embodiment a maximum voltage of one volt across the control windings gives the complete range of inductance change of the reactor and hence the regulation is at all times substantially better than one volt.

As already indicated, the arrangement is such that when the electrodes are short-circuited the voltage never falls below some 20 volts and hence the welding current builds-up rapidly at this time. The characteristics of voltage against welding current comprise a number of alternative curves depending upon the manual adjustment, but in each case the voltage falls rapidly from its maximum value to the desired datum and thereafter remains substantially constant up to the maximum welding current.

Figure 2:
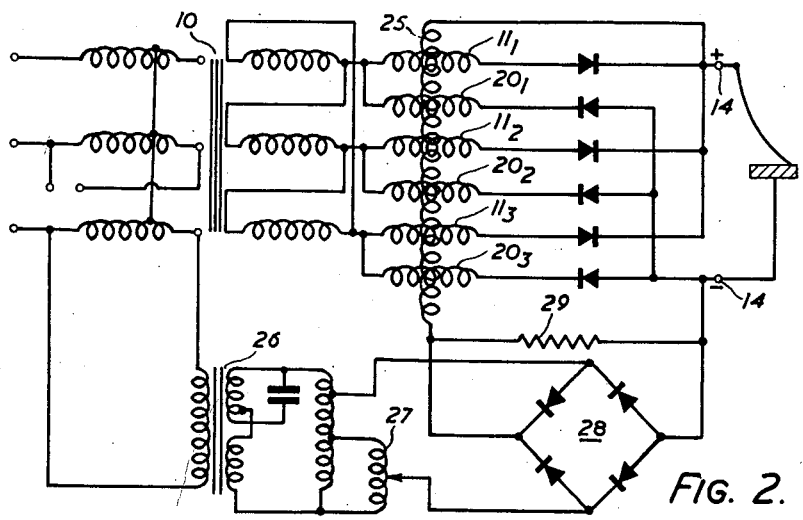

The described arrangement has been shown as incorporating a single-phase transformer, reactor and rectifier for use with a single-phase supply, but it will be appreciated that it may equally well incorporate a three-phase transformer, reactor and rectifier, for use with a three-phase supply. The circuit diagram of such an arrangement is shown in FIGURE 2 of the drawings.

What we claim as our invention and desire to secure by Letters Patent is:

1. Arc welding current control apparatus including alternating current supply terminals, direct current output terminals for connection to an arc welding device, rectifier means comprising at least two rectifying elements, and having its output connected to the output terminals, and an auto-excited saturable reactor having load windings of which each portion is connected in series with an element of the rectifier means, the saturable reactor being connected between the input terminals and the input of the rectifier means and being designed so that the maximum voltage which it can drop before its inductance falls off due to saturation, is substantially less than that across the supply terminals.

2. Apparatus as claimed in claim 2 which includes means for establishing a datum voltage which is constant in the sense of being independent of a load connected to the output terminals and at least one control winding for the saturable reactor to which is supplied the difference between the voltage across the output terminals and the datum voltage, in such direction that with rise of output voltage the control winding opposes the auto-excitation.

3. Arc welding current control apparatus for energisation by a supply of alternating current having at least one phase including alternating current supply terminals for each phase of the supply, direct current output terminals, a number of saturable reactors, which number is equal to the number of phases of the supply, a number of rectifiers, which number is equal to the number of phases of the supply, each rectifier having its direct current output connected to the direct current output terminals and its alternating current input connected through a respective one of the saturable reactors to respective alternating current supply terminals, each saturable reactor being designed so that the maximum voltage which it can drop before its inductance falls off due to saturation is substantially less than that across its respective supply terminals.

4. Apparatus as claimed in claim 3 which includes means for establishing a datum voltage which is constant in the sense of being independent of a load connected to the output terminals and at least one control winding for the saturable reactors to which is supplied the difference between the voltage across the output terminals and the datum voltage, in such direction that with rise of output voltage the control winding opposes the auto-excitation.

References Cited in the file of this patent

UNITED STATES PATENTS

| | | |
|---|---|---|
| 2,763,811 | Williams | Sept. 18, 1956 |
| 2,777,973 | Steele | Jan. 15, 1957 |
| 2,880,375 | Cresswell | Mar. 31, 1959 |